United States Patent Office 3,077,465
Patented Feb. 12, 1963

3,077,465
ONE COMPONENT ROOM TEMPERATURE VULCANIZABLE ORGANOPOLYSILOXANE ELASTOMERS
Leonard B. Bruner, Midland, Mich., assignor to Dow Corning Corporation, Midland, Mich., a corporation of Michigan
No Drawing. Filed Sept. 28, 1959, Ser. No. 842,616
6 Claims. (Cl. 260—46.5)

This invention relates to improved elastomeric compositions comprising acyloxy-endblocked polysiloxanes capable of complete curing at room temperature in the presence of very moist air.

My copending application Serial No. 723,110, filed March 24, 1958, now abandoned, discloses an acyloxy-endblocked organopolysiloxane compound capble of curing to a rubber in the presence of air-borne moisture. However, it has been found that where the absolute humidity is high, for example, at least 0.02 pound of water vapor per pound of dry air, this compound spread in a thick layer may suffer surface inhibition, i.e. lack of complete cure at the surface exposed to the moist air. Where this compound is spread in a thin layer, the surface inhibition may be so severe as to prevent gelation of the compound at all.

The primary object of this invention then is to provide a modified one-component room temperature curing elastomer which is not subject to the aforementioned surface inhibition. Another object of this invention is to provide such a modified compound without affecting the storage stability and handling advantages of the unmodified compound.

This invention relates to a composition consisting essentially of (1) a compound of the formula

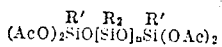

in which Ac is a saturated aliphatic monoacyl radical, R and R' are selected from the group consisting of monovalent hydrocarbon radicals, halogenated monovalent hydrocarbon radicals and cyanoalkyl radicals and $n$ is an integer of at least 5 and (2) from 0.001 to 10 percent by weight based on the weight of (1) of a carboxylic acid salt of a metal ranging from lead to manganese inclusive in the electromotive series of metals.

Component (1) of this invention is fully described in my aforementioned copending application, Serial No. 723,110, filed March 24, 1958. This compound is prepared by reacting in the substantial absence of moisture acyloxy silanes of the formula R'Si(OAc)$_3$ with hydroxylated siloxanes of the formula

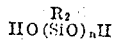

a reaction which occurs spontaneously upon mixing the two components at any convenient temperature generally in the range of room temperature up to 200° C. This reaction can be carried out in a mutual solvent, if desired.

For the purpose of this invention the Ac groups can be any saturated aliphatic monoacyl radical such as propionyl, butyryl, hexoyl, 2-ethylhexoyl, octanoyl, isovaleryl and stearyl. Also, for the purpose of this invention, R and R' can each be any monovalent hydrocarbon radical including, for example, any alkyl radical such as methyl, ethyl, butyl, tertiary-butyl, octadecyl and myricyl; any alkenyl radical such as vinyl, allyl or hexenyl; any cycloaliphatic hydrocarbon radical such as cyclohexyl, cyclopentyl, cyclohexenyl and cyclobutyl; any alkaryl hydrocarbon radical such as benzyl or β-phenylethyl and any aromatic hydrocarbon radical such as phenyl, tolyl, xylyl, naphthyl, xenyl and phenanthryl. R and R' can also be any halogenated monovalent hydrocarbon radical such as chloromethyl, pentafluorobutyl, trifluorovinyl, chlorophenyl, bromophenyl, α,α,α-trifluorotolyl, bromoxenyl, chlorotrifluorocyclobutyl, chlorocyclohexyl and iodophenyl.

In addition either R or R' or both can be any cyanoalkyl radical such as beta-cyanoethyl, gamma-cyanopropyl, omega-cyanobutyl, beta-cyanopropyl, gamma-cyanobutyl and omega-cyanooctadecyl. When the products of this invention contain cyanoalkyl radicals it is preferred that such radicals be attached to at least 1 mol percent of the silicon atoms in the siloxane elastomer.

For the purpose of this invention the polymer size of the compositions can vary from thin fluids where $n$ has a value of 5 to non-flowing gums where $n$ has a value of 10,000 or more. It should be understood that for the purpose of this invention mixtures of compounds can be employed which contain molecular species of varying values for $n$. It should also be understood that different acyl groups can be present in any one molecule and various types of R and R' groups can appear in any one molecule. In short, single acyloxy silanes can be employed in the reaction or mixtures of two or more different acyloxy silanes may be engaged. Also, it should be understood that the hydroxylated siloxane can be a homopolymer or it can be a copolymer of two or more different siloxane units. It should also be understood that mixtures of two or more hydroxylated siloxanes can be employed. Often in actual commercial operation the compositions employed will be mixtures of several molecular species where $n$ has different values. It should be understood, of course, that a pure species where all of the molecules have the same degree of polymerization can also be used.

The hydroxylated siloxanes employed in this invention are well-known materials and may be prepared by any of the methods commonly employed to prepare such materials. The acyloxy silanes employed herein are best prepared by one of two methods. The first is that of reacting the corresponding acid anhydride with the corresponding chlorosilane. Under these conditions reaction occurs spontaneously with the evolution of an acyl halide. For example, methyltrichlorosilane plus acetic anhydride gives methyltriacetoxysilane and acetyl chloride. The acetyl chloride can then be removed by distillation. The second method is that of reacting an alkali metal salt of the corresponding acid with a chlorosilane. For example, sodium formate plus methyltrichlorosilane give methyltriformyloxysilane and sodium chloride.

Component (2) is a carboxylic acid salt of a metal ranging from lead to manganese inclusive in the electromotive series of metals. Specifically, the metals included are lead, tin, nickel, cobalt, iron, cadmium, chromium, zinc and manganese. The carboxylic acids employed in the preparation of the salts of this component can be monocarboxylic acids or dicarboxylic acids. It is preferable that the salt be soluble in the siloxane although insoluble salts may be employed if they are properly dispersed in the system. The dispersion can be carried out by employing a solution of the salt in a mutual solvent with the siloxane, or the salt can be dispersed on a filler and thereafter milled into the siloxane.

Specific examples of salts which are operative in this invention are lead naphthenate, cobalt naphthenate, zinc naphthenate, iron 2-ethylhexoate, lead 2-ethylhexoate, chromium octoate and lead sebacate. However, the preferred salts are those of hydrocarbon-substituted tin or lead because these salts tend to be more compatible with these systems. Examples of these preferred lead and tin salts include monoorganometallic carboxylates, such as carbomethoxyphenyltintrisuberate, isobutyltin tricerotate, cyclohexenyllead triacotinate and xenyllead trisalicylate; diorganometallic carboxylates, such as dimethyltin dibutyrate, dibutyltin diacetate, divinyltin biscyclopentylacetate, dibutyltin dibenzoate, dibutyltin di-2-ethylhexoate, dibutyltin dilaurate, dibutyltin maleate, dibutyltin adipate, diisoamyltin bistrichlorobenzoate, diphenyllead diformate, dibutyltin dilactate, dicyclopentyllead bismonochloroacetate, dibenzyllead di-2-pentenoate and diallyllead di-2-hexenoate; triorganometallic carboxylates, such as triethyltin bitartrate, tributyltin acetate, triphenyltin acetate, tricyclohexyltin acrylate, tritolyltin terephthalate, tri-n-propyllead acetate, tristearyllead succinate, trinaphthyllead p-methylbenzoate and trisphenylethyllead cyclohexenylacetate; and dicarboxylic acid disalts, such as triphenyllead ethyl malonate.

Component (2) need be present only in very small amounts, e.g. 0.001 percent by weight based on the weight of component (1). The upper limit is not critical, but no more than 10 percent by weight of the salt based on the weight of (1) is generally needed, preferably less than 2 percent.

If desired, various other ingredients can be present such as fillers, flame retardants, stabilizing agents and plasticizers such as siloxane fluids. Suitable fillers include powdered metals such as aluminum, tin and zinc; powdered silicon, silica, mica, clay and metal oxides such as iron oxide. Suitable flame retardants are antimony oxide, polychlorinated hydrocarbons such as polychlorinated biphenyls and polychlorinated paraffin oils and organic sulfamates.

The compositions of this invention are useful as coatings generally and as sealants especially for metal, wood or masonry.

The following examples are merely illustrative of the compositions of this invention and are not intended to limit the invention which is properly delineated in the claims. All viscosity measurements were made at 25° C.

Example 1

The base composition employed in this example was a mixture of the reaction product of 100 parts by weight of an approximately 10,000 cs. hydroxy-endblocked dimethylpolysiloxane and 10 parts by weight of methyltriacetoxysilane with 40 parts by weight of 1000 cs. trimethylsiloxy-endblocked dimethylpolysiloxane and 14 parts by weight of a fume silica.

To various samples of this base composition were added 0.10%, 0.25% and 0.5% by weight dibutyltin diacetate based on the amount of the 10,000 cs. dimethylpolysiloxane. Films of these stocks ranging from an average of 1 to 5 mils in thickness to 0.25 inch all cured to rubbers in less than 30 minutes in humid air. A similar composition containing no dibutyltin diacetate does not cure in a thin film, e.g. 1 to 5 mils, and shows lack of cure at the surface of a thick film, e.g. 0.25 inch or more, indefinitely under the same circumstances.

Example 2

When 10 parts by weight of vinyltriacetoxysilane are substituted for the methyltriacetoxysilane employed in the preparation of the base composition of Example 1, the ultimate results are the same.

Example 3

When 100 parts by weight of either a 100,000 cs. hydroxy-endblocked 3,3,3-trifluoropropylmethylpolysiloxane or a 1000 cs. hydroxy-endblocked phenylmethylpolysiloxane or a 46 cs. hydroxy-endblocked dimethylpolysiloxane are substituted for the 10,000 cs. hydroxy-endblocked dimethylpolysiloxane employed in the preparation of the base composition of Example 1, the ultimate results are the same.

Example 4

When lead 2-ethylhexoate, iron 2-ethylhexoate, cobalt 2-ethylhexoate, manganese 2-ethylhexoate, zinc 2-ethylhexoate, butyltin tri-2-ethylhexoate, dibutyltin dilaurate, dibutyltin maleate, diphenyllead diformate, triphenyltin acetate and tri-n-propyllead acetate are substituted for the dibutyltin diacetate in Example 1, the resulting compositions cure in both thick and thin films.

That which is claimed is:

1. A composition consisting essentially of (1) a compound of the formula

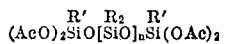

$$(AcO)_2SiO[SiO]_nSi(OAc)_2$$
$$\phantom{(AcO)_2S}R' \phantom{O[}R_2\phantom{]_n}R'$$

in which Ac is a saturated aliphatic monoacyl radical, R and R' are selected from the group consisting of monovalent hydrocarbon radicals, halogenated monovalent hydrocarbon radicals and cyanoalkyl radicals and $n$ is an integer of at least 5 and (2) from 0.001 to 10 percent by weight base on the weight of (1) of a carboxylic acid salt of a metal ranging from lead to manganese inclusive in the electromotive series of metals.

2. The composition of claim 1 wherein each Ac is the acetyl radical and R and R' are methyl radicals.

3. The composition of claim 1 wherein some R and R' radicals are methyl radicals and the remainder are 3,3,3-trifluoropropyl radicals and each Ac is the acetyl radical.

4. The composition of claim 1 wherein each Ac is the acetyl radical, each R' is the methyl radical, some of the R groups are phenyl radicals and the remainder are methyl radicals.

5. The composition of claim 1 wherein R and R' are monovalent hydrocarbon radicals of which at least some but no more than 1 mol percent are vinyl radicals.

6. The composition of claim 1 wherein each Ac is the acetyl radical, each R' is the vinyl radical, some R groups are methyl radicals and the remainder of the R groups are 3,3,3-trifluoropropyl radicals.

References Cited in the file of this patent

UNITED STATES PATENTS 2,843,555    Berridge _____ July 15, 1958

FOREIGN PATENTS 1,188,495    France _____ Mar. 16, 1959